(12) United States Patent
Schmalenberg et al.

(10) Patent No.: US 10,679,530 B1
(45) Date of Patent: Jun. 9, 2020

(54) SYSTEMS AND METHODS FOR MOBILE PROJECTION IN FOGGY CONDITIONS

(71) Applicant: Toyota Motor Engineering & Manufacturing North America, Inc., Plano, TX (US)

(72) Inventors: Paul Schmalenberg, Ann Arbor, MI (US); Ercan M. Dede, Ann Arbor, MI (US)

(73) Assignee: Toyota Motor Engineering & Manufacturing North America, Inc., Plano, TX (US)

( * ) Notice: Subject to any disclaimer, the term of this patent is extended or adjusted under 35 U.S.C. 154(b) by 0 days.

(21) Appl. No.: 16/272,833

(22) Filed: Feb. 11, 2019

(51) Int. Cl.
*G09F 19/18* (2006.01)
*G09F 19/22* (2006.01)
*G02B 30/56* (2020.01)

(52) U.S. Cl.
CPC ............ *G09F 19/18* (2013.01); *G02B 30/56* (2020.01); *G09F 19/22* (2013.01)

(58) Field of Classification Search
CPC .... G03B 21/008; G03B 21/28; G03B 21/147; G03B 21/206; G03B 21/2013; G03B 21/2033; G03B 21/2053; G03B 21/2066; G02B 27/0068; G02B 27/0101; G02B 27/1066; G02B 27/2292; G09F 19/14; G09F 19/18; G09F 19/22; G09F 19/226
See application file for complete search history.

(56) References Cited

U.S. PATENT DOCUMENTS

| | | |
|---|---|---|
| 5,580,140 A | 12/1996 | Katz et al. |
| 6,556,178 B1 | 4/2003 | Johnson |
| 6,857,746 B2 | 2/2005 | Dyner |
| 7,619,626 B2 | 11/2009 | Bernier |

(Continued)

FOREIGN PATENT DOCUMENTS

| | | |
|---|---|---|
| CN | 107608570 A | 1/2018 |
| DE | 4206142 A1 | 9/1993 |

(Continued)

OTHER PUBLICATIONS

Miu-Ling Lam et al., "Interactive volumetric fog display", ACM Digital Library, Nov. 2-6, 2015, https://dl.acm.org/citation.cfm?id=2818488 (1 page total).

(Continued)

*Primary Examiner* — Sultan Chowdhury
(74) *Attorney, Agent, or Firm* — Dinsmore & Shohl LLP

(57) ABSTRACT

Systems and methods for projecting images from a vehicle onto a dynamic projection surface within an aerosol are provided. A method may include performing an initial scan of the aerosol to determine a projection surface within the aerosol based upon an aerosol density map. The method may further include projecting an image onto the projection surface within the aerosol. The method may also include performing an updated scan to update the projection surface based on changing depth and changing distance of the projection surface relative to the scanning device over time. The method may additionally include modifying the image being projected based upon a change to the projection surface due to one or more of a motion of the vehicle and a change in the aerosol.

20 Claims, 8 Drawing Sheets

(56) References Cited

U.S. PATENT DOCUMENTS

| | | | | |
|---|---|---|---|---|
| 2004/0066376 A1* | 4/2004 | Donath | ............... | B60R 1/00 |
| | | | | 345/169 |
| 2019/0166338 A1* | 5/2019 | Greenwood | ........... | B60Q 1/305 |
| 2019/0179028 A1* | 6/2019 | Pacala | ................ | G01S 7/497 |
| 2019/0205662 A1* | 7/2019 | Samal | ................ | B60K 35/00 |

FOREIGN PATENT DOCUMENTS

| | | |
|---|---|---|
| DE | 102015109132 A1 | 12/2016 |
| EP | 1916153 B1 | 6/2018 |
| FR | 2 991 787 B1 | 7/2014 |
| WO | 2007/036010 A1 | 4/2007 |
| WO | 2012/105973 A1 | 8/2012 |
| WO | 2018029978 A1 | 2/2018 |

OTHER PUBLICATIONS

Ippei Suzuki et al., "Gushed light field: design method for aerosol-based fog display", ACM, Dec. 5-8, 2016, DOI: http://dx.doi.org/10.1145/2988240.2988244; https://dl.acm.org/citation.cfm?doid=2988240.2988244 (2 pages total).

* cited by examiner

```
┌─────────────────────────────────────────────────────┐
│ PERFORM INITIAL SCAN FROM A VEHICLE OF AEROSOL TO   │─802
│ DETERMINE A PROJECTION SURFACE WITHIN THE AEROSOL   │
│ BASED UPON DETECTING AEROSOL PORTIONS VIA A DENSITY MAP │
└─────────────────────────────────────────────────────┘
                          │
                          ▼
        ┌─────────────────────────────────────┐
        │ PROJECT AN IMAGE ONTO THE PROJECTION PLANE │─804
        └─────────────────────────────────────┘
                          │
                          ▼
    ┌─────────────────────────────────────────────┐
    │ PERFORM UPDATED SCAN TO UPDATE THE PROJECTION │
    │ SURFACE BASED ON CHANGING DEPTH AND DISTANCE OF THE │─806
    │ PROJECTION SURFACE RELATIVE TO THE VEHICLE  │
    └─────────────────────────────────────────────┘
                          │
                          ▼
        ┌─────────────────────────────────────┐
        │ MODIFY THE PROJECTED IMAGE BASED UPON A CHANGE │─808
        │         TO THE PROJECTION SURFACE        │
        └─────────────────────────────────────┘
```

FIG. 8

SYSTEMS AND METHODS FOR MOBILE PROJECTION IN FOGGY CONDITIONS

TECHNICAL FIELD

The present disclosure generally relates to driver assistance and, more particularly, to systems and methods for utilizing a vehicle's surrounding conditions to project imagery for drivers.

BACKGROUND

When a vehicle is driven through an area with a large amount of airborne aerosols (such as fog, smog, snow, rain), vision can be occluded due to decreased visibility. The vehicle may have sensors (e.g., radar, lidar) that detect objects further into the aerosol than human vision can see. For example, an indication of a detected object can be displayed to the driver on a screen inside the vehicle. However, any benefit of this may be negated by making the driver divert their attention from driving conditions that require additional attention due a decrease in both visibility and driver reaction time.

SUMMARY

In one embodiment, a system for projecting images from a vehicle onto a dynamic projection surface within an aerosol is disclosed. The system may include a scanning device, to be mounted on a vehicle, and configured to perform an initial scan of the aerosol to determine a projection surface within the aerosol based upon an aerosol density map. The scanning device may be further configured to perform an updated scan to update the projection surface based on a changing depth and a changing distance of the projection surface relative to the scanning device over time. The system may further include a projector to be mounted on the vehicle that is configured to project an image onto the projection surface within the aerosol. The projector may be further configured to modify the projected image based upon a change to the projection surface due to one or more of a motion of the vehicle and a change in the aerosol.

In another embodiment, a method for projecting images from a vehicle onto a dynamic projection surface within an aerosol may include performing an initial scan of the aerosol to determine a projection surface within the aerosol based upon an aerosol density map. The method may further include projecting an image onto the projection surface within the aerosol. The method may also include performing an updated scan to update the projection surface based on changing depth and changing distance of the projection surface relative to the scanning device over time. The method may additionally include modifying the image being projected based upon a change to the projection surface due to one or more of a motion of the vehicle and a change in the aerosol.

In yet another embodiment, a system for projecting images from a vehicle onto a dynamic projection surface within an aerosol may include a Flash LiDAR device that includes a plurality of infrared LEDs and at least one three dimensional focal plane array. The Flash LiDAR device may be mounted on a vehicle and configured to use single photon counting to scan the aerosol to determine laser beam characteristics. The Flash LiDAR device may be further configured to perform an initial scan of the aerosol that determines a projection surface within the aerosol based upon an aerosol density map based upon density and particle size of the aerosol as determined by the Flash LiDAR device. The initial scan of the aerosol may also determine that the projection surface is neither flat nor linear. The Flash LiDAR device may also be configured to perform an updated scan to update the projection surface based on changing depth and changing distance of the projection surface relative to the scanning device aboard the vehicle over time. The system may additionally include a laser projector to be mounted on the vehicle that is configured to project onto the projection surface, using a laser beam according to the laser beam characteristics, a warped image. The projected image may be warped to appear flat from a viewpoint within the vehicle, such that the laser beam characteristics include a waist and a range of the laser beam based on a depth and a distance of the projection surface from the scanning device. The laser projector may be further configured to modify the image being projected based upon a change to the projection surface due to one or more of a motion of the vehicle and a change in the aerosol.

These and additional features provided by the embodiments described herein will be more fully understood in view of the following detailed description, in conjunction with the drawings.

BRIEF DESCRIPTION OF THE DRAWINGS

The embodiments set forth in the drawings are illustrative and exemplary in nature and not intended to limit the subject matter defined by the claims. The following detailed description of the illustrative embodiments can be understood when read in conjunction with the following drawings, where like structure is indicated with like reference numerals and in which:

FIG. 8 is a flow chart depicting an exemplary process of projecting an image onto a changing projection surface within an aerosol according to one or more embodiments described and illustrated herein.

DETAILED DESCRIPTION

Embodiments of the present disclosure are directed to systems and methods for mobile projection in aerosols, such as when conditions are foggy, hazy, rainy, dusty, smoky, or snowy. Drivers experience less reaction time to objects (other vehicles, animals, obstacles, road signs, turns, and the like) when visibility is reduced in such driving conditions. Specifically, increasing a driver's situational awareness in reduced-visibility conditions, by providing more advance notice of objects, helps the driver compensate for the challenges posed by reduced visibility and corresponding reaction time.

Aerosols often contain one or more planes and/or surfaces suitable for projection, which may be performed with one or more lasers. These projection surfaces within the aerosol may be detectable by a scanning device on the vehicle, and once projection surfaces are found, they may be analyzed for projection suitability. An image, projected outside the vehicle in order to be seen by the driver, may be modified. The image modification may be such that when a projector on the vehicle outputs the image onto a projection surface, the image maintains its intended appearance to the driver despite distortions introduced by the projection surface. The vehicle may also perform updated scans of the aerosol to detect new projection surfaces, as well as changes in the current projection surface. In this way, the image may appear consistent from the driver's point of view even as the spatial relationship between the vehicle and the projection surfaces change over time. The ability to provide drivers with accurate imagery within an aerosol may in turn lead to improvements in how the drivers operate vehicles when encountering such conditions.

Referring now to FIG. 1, a diagram 100 of a vehicle 102 performing a scan 110 upon an aerosol 108 is depicted. In this embodiment, a vehicle 102 may include anything capable of transporting one or more passengers, including but not limited to cars, trucks, motorcycles, bicycles or any other type of passenger-powered vehicles, aircraft, and watercraft. A vehicle 102 may be navigated by an operator, such as a driver, pilot, captain, etc. In other embodiments, the vehicle may be partially autonomous, for example where the vehicle completes some tasks for the driver, such as parking or keeping the vehicle in a lane. In still other embodiments, the vehicle may be autonomous, for example where the vehicle operates with little or no input (such as providing destination information and/or route preferences, and/or as discussed in more detail below, image projection options) from any occupant. In some embodiments, the vehicle 102 may be autonomous and transport occupants without any driver(s).

An aerosol 108 may be present near the vehicle 102, as used herein, an "aerosol" includes any particulate that can be suspended in air (e.g., dust, sand/dirt, fog, liquid vapor/droplets, mist, rain, snow, sleet, ash, pollution, and the like). The aerosol 108 may exist and/or be formed independent of whether the vehicle 102 is present. Other causes of aerosol 108 formation may include weather/environment phenomena (fog, smog, fire, volcanic activity, man-made causes such as explosions, and the like). An aerosol 108 may be made up of multiple aerosol portions 112 each having differing particle size, depth, particle density. The aerosol parameters may vary in these dimensions.

The vehicle 102 may include a scanning device 104 to generate a scan 110 of an aerosol 108. A scanning device 104 may be located in any suitable location on and/or inside the vehicle 102. Any suitable number of scanning devices 104 may be utilized, and not all of a vehicle's scanning devices are necessarily the same. In this embodiment, the scanning device 104 is a Flash LiDAR device, including a plurality of infrared LEDs 109 and at least one three dimensional focal plane array 111, with single photon counting capability to build a three dimensional data set modeling the shape and density of the aerosol 108. In other embodiments, any suitable scanning device may be utilized, such as laser, radar, or any other suitable aerosol scanning technique/technology. In some embodiments, vehicle 102 may include one or more projectors 106, as described in more detail below. Any suitable number of scanning projectors 106 may be utilized, and not all of a vehicle's projectors are necessarily the same. In some embodiments, a scanning device 104 and a projector 106 may be located within the same device.

The scanning device 104 may analyze the aerosol 108 for aerosol parameters (i.e., characteristics) to determine whether or not the aerosol is suitable for image projection. Aerosol parameters include, but are not limited to, particle size, depth, particle density, and the like. An aerosol density map may be generated based upon density and particle size of the aerosol as determined by the scanning device 104. The scanning device 104 may compare the particle size, depth, and particle density of the aerosol portions 112 for projecting images and verify that these values will support a projection surface (as discussed in more detail below). This comparison determination may be performed by any component aboard or remote from the vehicle 102. For example, if the particle density of an aerosol portion 112 is not sufficient, another scan 110 (i.e., more photon counting pulses may be utilized and sent into an aerosol 108) may be performed upon another portion 112 of the aerosol 108 until the measured particle density is found to be sufficient for determining a projection surface.

The scan 110 may alternate between different portions 112 within an aerosol (and/or within other aerosols) and return to previously-scanned portions 112. Additionally, a subsequent scan of the aerosol 108 may return different results over time based upon the aerosol 108 changing/moving and/or the position of the vehicle 102 relative to the aerosol 108 (i.e., the vehicle moving such that the distance and/or orientation with respect to the aerosol 108 changes). In other embodiments, the scanning device 104 may rescan the same portion 112 of the aerosol 108 repeatedly, as the scanned portion 112 may change over time. In some embodiments, the scanning device 104 may utilize a scanning refresh rate governed by a scanning refresh rate parameter that may be specified by a user, reside within software or a database, or hardwired in the scanning device 104 or vehicle 102. In embodiments, the scanning device 104 may receive data pertaining to objects external to the vehicle 102. For example, the scanning device 104 may detect or otherwise obtain data about other vehicles on the road (rate of speed of approach, heading, size, and the like) as non-limiting examples, object detection may be done by data from lidar, radar, camera or other sensors, any known or yet-to-be-developed system and method for detecting objects may be employed. Objects may also output data that can then be received by the scanning device 104. For example, the output data may be the object self-representing itself in a way that can then be output by a projector 106 onto a virtual image plane for an occupant of the vehicle 102 (discussed in more detail below).

Figure 1:
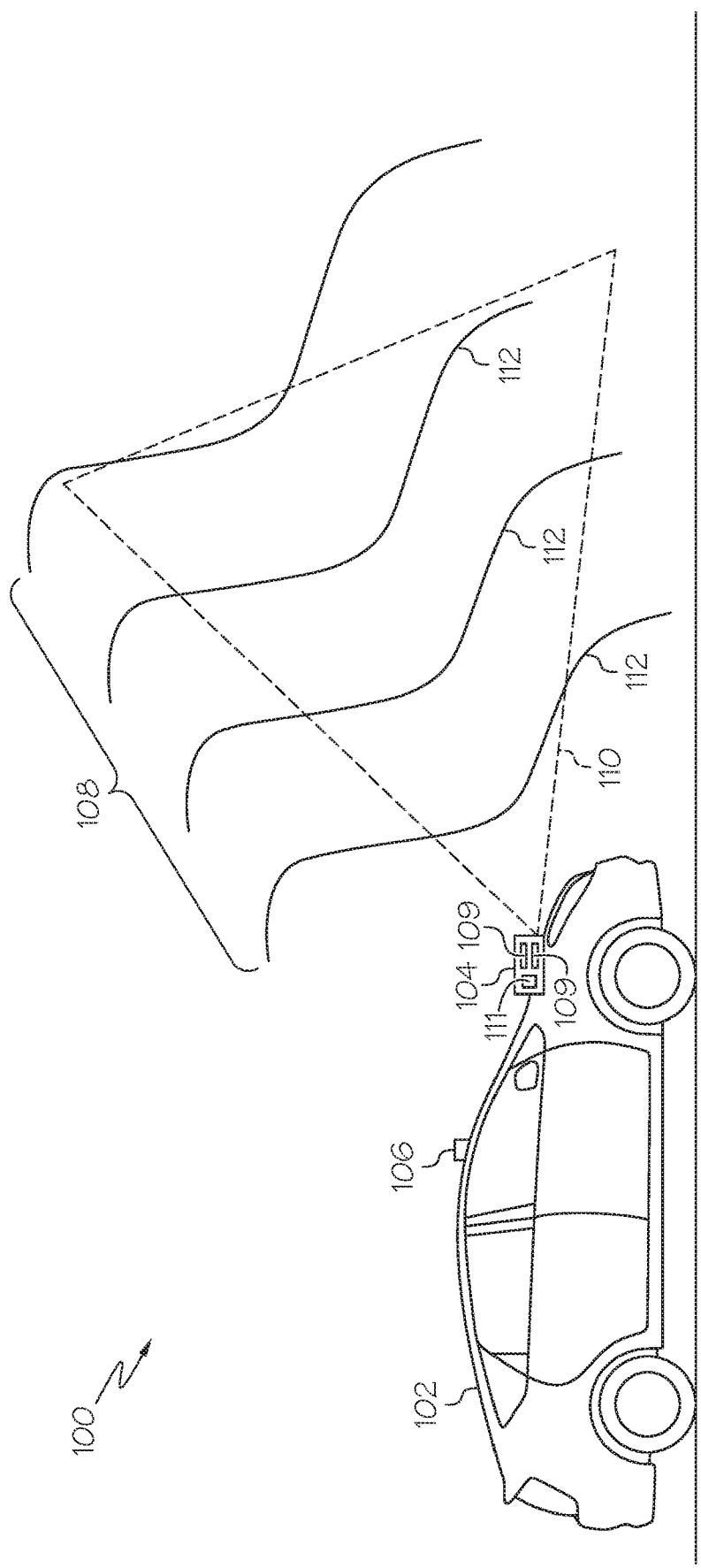
FIG. 1 schematically depicts a side view of a vehicle scanning an aerosol according to one or more embodiments described and illustrated herein.
Figure 2:
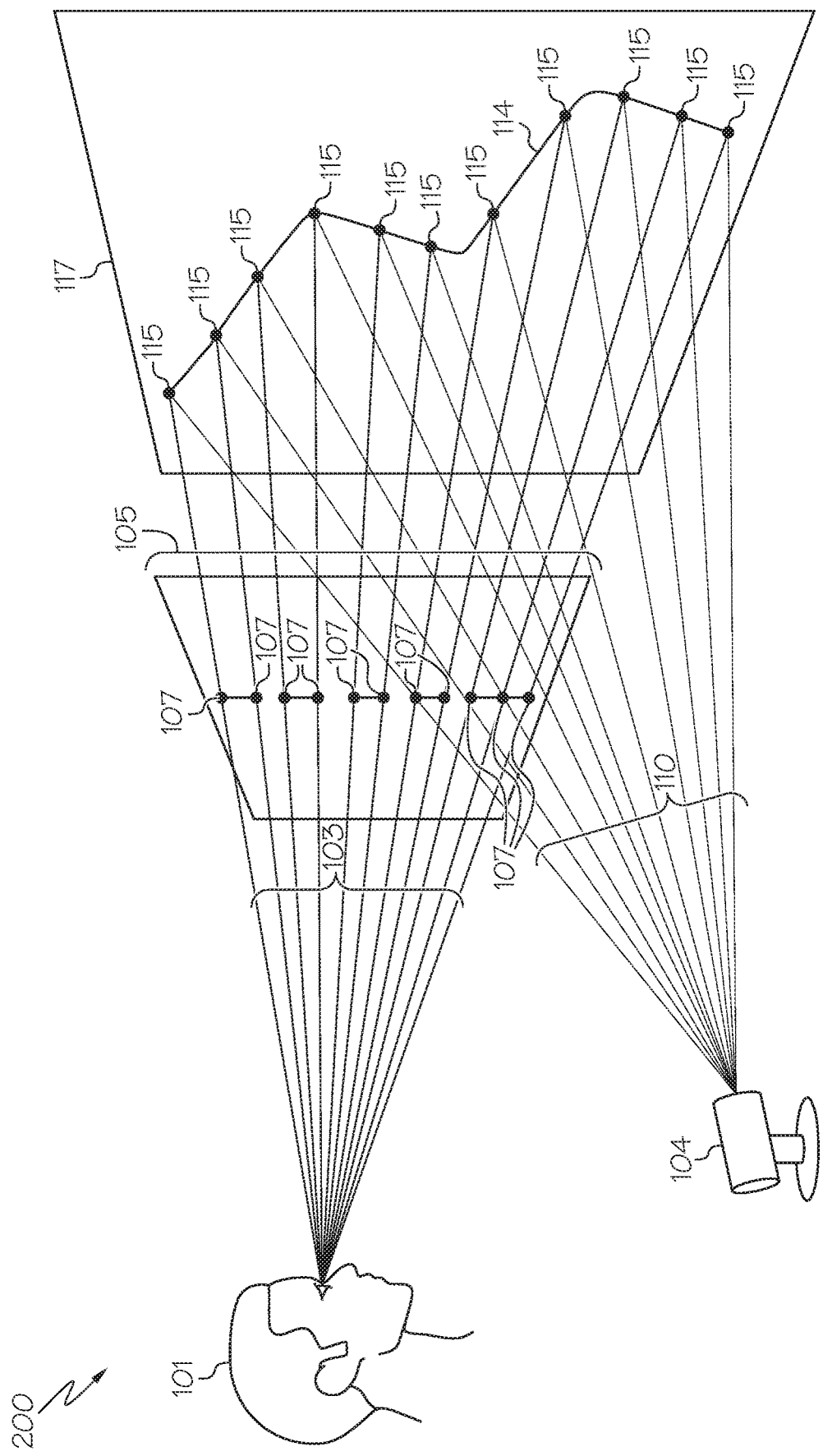
FIG. 2 schematically depicts a side view of a virtual image plane based upon a projection surface according to one or more embodiments described and illustrated herein.

Turning to FIG. 2, a diagram 200 illustrates a virtual image plane 105 based upon a projection surface 114 within an aerosol 108. This embodiment depicts a relationship between an observer viewpoint 103 of a virtual image plane 105 (i.e., the point of view of a vehicle occupant 101 such as the driver of the vehicle 102) and a scanner viewpoint of a projection surface 114. As further discussed below with respect to FIG. 5, an image of an object to be projected may be generated. The image may also be stored in a representation of the virtual image plane 105, for example, in computer memory (such as provided with respect to FIG. 7). Ray tracing may be performed with respect to a known observer perspective 103 through virtual image plane points 107 in the virtual image plane 105 and onto projection surface points 115 at the projection surface 114, where the projection surface 114 may reside within a projection plane 117. The projection surface points 115 (i.e., the calculated points on the projection surface) may then be calculated back to the position of the scanning device 104 to determine movement of the scanning device 104. The projection surface points 115 may be interpolated to achieve smooth scanning movement of the scanning device 104. In this embodiment, an image is projected onto the projection surface 114 within an aerosol portion 112 in which the projection surface 114 may be neither flat nor linear in three-dimensional space. Where more than one suitable projection surface 114 exists, a three dimensional image may be projected onto the plurality of projection surfaces. As discussed further below with respect to FIG. 6, the image may be projected onto the projection surface 114 in such a way as to counteract and/or minimize distortions of how the image appears in the virtual image plane 105 from the observer viewpoint (such as the driver or an occupant of the vehicle 102).

Figure 3:
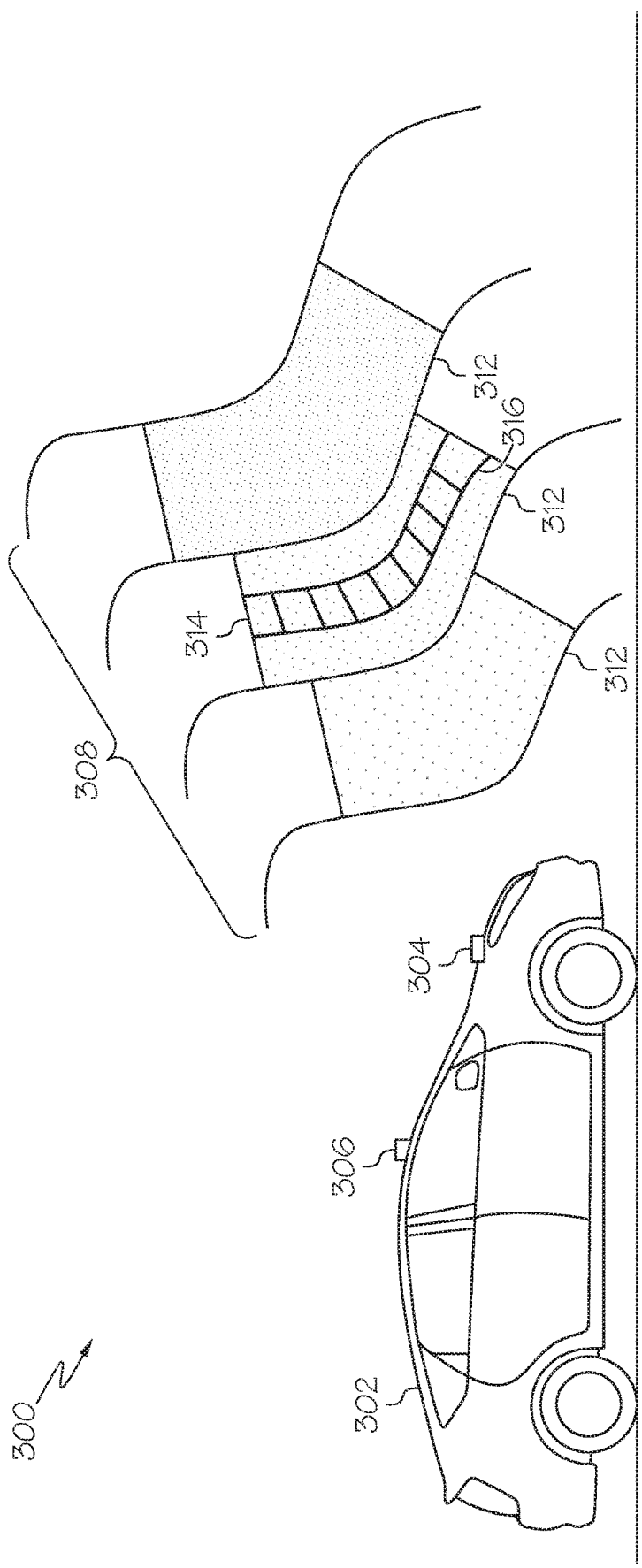
FIG. 3 schematically depicts a side view of a detected projection surface within the aerosol in front of the vehicle from FIG. 1 according to one or more embodiments described and illustrated herein.

Turning to FIG. 3, a schematic diagram 300 illustrates a detected projection surface 314 within the aerosol 308 in front of the vehicle 302. It should be understood that the schematic diagram 300 of FIG. 3 is for illustrative purposes only. In the illustrated embodiment, the aerosol 308 has been scanned by the scanning device 304 to reveal three aerosol portions 312 and a projection surface 314 having a projection surface depth 316 within one of the aerosol portions 312. In some cases, there may not be distinct aerosol portions. An aerosol density map, obtained from the scanning device 304, may be utilized to determine projection surfaces 314 with respective projection surface depths 316. The density map can then identify any portions 312 of the aerosol have at least a threshold density to sustain/reflect the images for at least a minimum duration threshold. In some embodiments, an aerosol portion 312 may have more than one projection surface 314 at a time. Some or all of the aerosol portions 312 may each have one or more projection surfaces. A projection surface 314 as determined may be updated based upon a scanning refresh rate governed by a specified scanning refresh rate parameter. The scanning device 304 may also determine the thickness of projection surface 314 to see if it is within minimum/maximum thickness threshold values. For example, if a projection surface is too thin, it may not be able to support image projection, such that the image projection would pass through the projection surface instead of being reflected by the projection surface in order to be visible.

Figure 4:
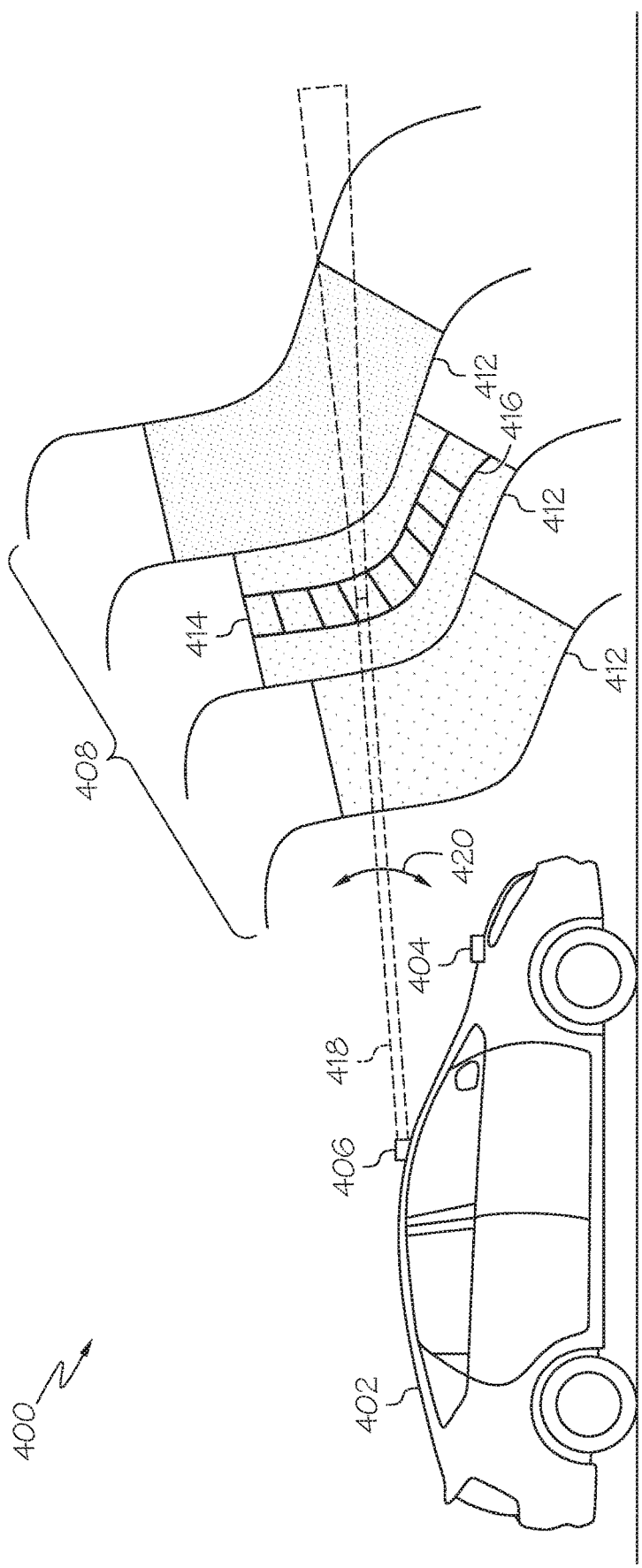
FIG. 4 schematically depicts a side view of the vehicle using a laser to project an image onto the projection surface from FIG. 3 according to one or more embodiments described and illustrated herein.

Turning now to FIG. 4, a schematic diagram 400 illustrates the projector 406 emitting a laser 418 to project an image at the aerosol 408 containing the projection surface 414. It should be understood that the schematic diagram 400 of FIG. 4 is for illustrative purposes only. The projector 406 may provide a laser movement range 420, which may be in any axial direction(s). Any number of projectors may be utilized. The laser movement range 420 may be based upon the configuration of the projector 406, the vehicle 402, and/or the vantage point of the projector 406 with respect to its location on or in the vehicle 402. In other embodiments, a projector 406 may emit a stationary laser without a laser movement range 420. Any suitable type of laser emitting device may be utilized as a projector 412. Laser beam characteristics of the laser 418 may be selected based upon the scanning device 404 used to scan the aerosol. Characteristics of a laser 418 may include the waist, wavelength and a range of the beam, which may be based upon a depth and a distance between the projection surface 414 and the scanning device 404. The waist (i.e., the measure of the beam size at the point of its focus) and range of the laser beam may be updated based on a changing depth and/or a changing distance between the projection surface 414 and the scanning device 404 based upon an updated scan 110.

As discussed above, the scanning device 404 may receive data from external objects, either by detecting the objects directly or receiving data output by the objects. The projector 406 may project an image pertaining to the external object based upon the data received from the external object. The projector 406 may modify a visible characteristic of a displayed object, such as modifying the projected size of an object within the projected image based on a changing proximity of the object to the scanning device 404 and/or projector 406. For example, an object such as another vehicle may be initially projected to appear small on the virtual image plane 105. As the other vehicle approaches, the projected version of that vehicle grows in size to indicate it is getting closer. Conversely, a vehicle moving away may be projected as a progressively shrinking projection on the virtual image plane 105. Image projection options may be specified by a user (such as a vehicle occupant or a remote user), reside within software or a database, or hardwired into the scanning device 404, projector 406, and/or vehicle 402. As another example, the size of the displayed object is selected based on the distance from the vehicle to the physical object. A far-away object may be displayed to appear smaller than a close by object. Examples of image projection options include notification thresholds (when a vehicle occupant should be notified of detected external objects), minimum and/or maximum projection surface 414 thickness thresholds, specifying the location of an observer viewpoint 103 within the vehicle 402, and the like.

Figure 5:
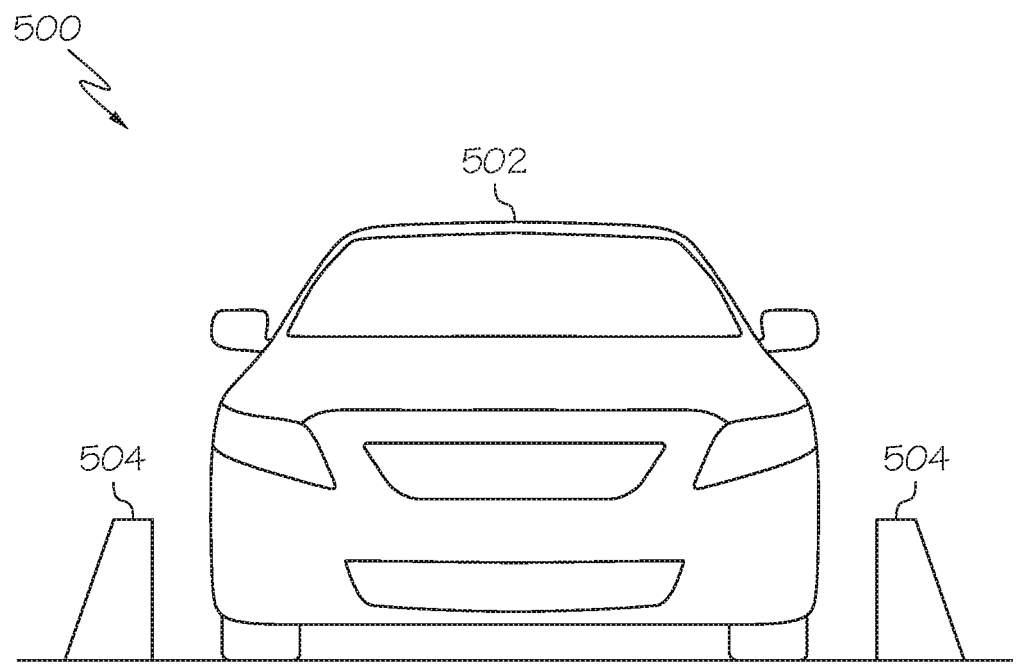
FIG. 5 schematically depicts an image to be projected onto a projection surface according to one or more embodiments described and illustrated herein.

Referring to FIG. 5, a diagram 500 illustrates an original image to be projected onto a projection surface 414. In this embodiment, a vehicle 502 with surrounding objects 504 are provided, and also represents how the original image is intended to appear in the virtual image plane 105 while being projected onto the projection surface 414.

Figure 6:
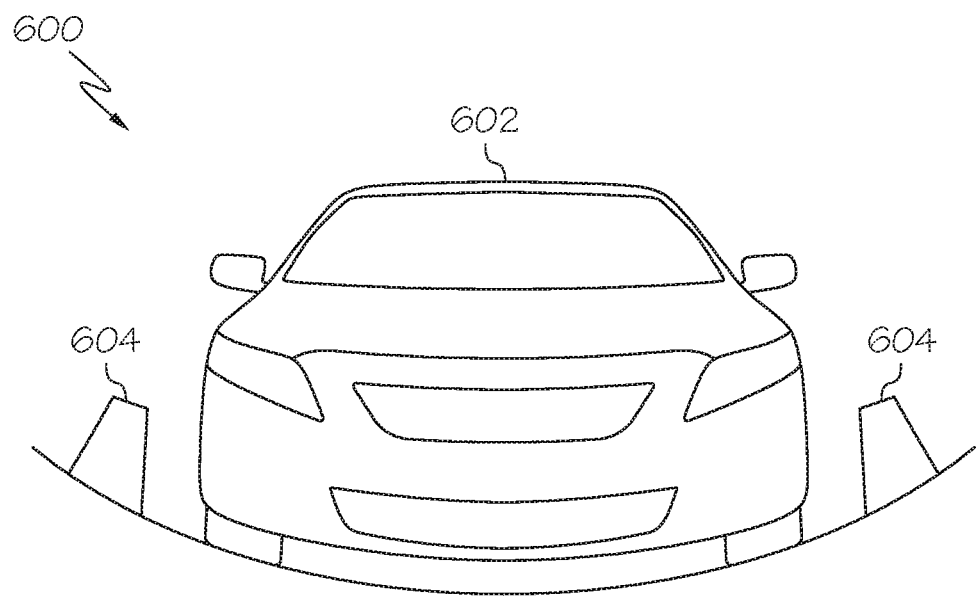
FIG. 6 schematically depicts a modified version of the image depicted in FIG. 5 after being processed to account for characteristics of the projection surface according to one or more embodiments described and illustrated herein.

FIG. 6 depicts a diagram 600 illustrating a modified image 602 as projected onto a projection surface. In this embodiment, the vehicle 602 and surrounding objects 604 are emitted by the projector 406 as a warped image to compensate for the non-flat and non-linear projection surface 414 from a viewpoint within the vehicle 402. For example, a curve in the projection surface 414 can be counteracted by generating the modified image 602.

Figure 7:
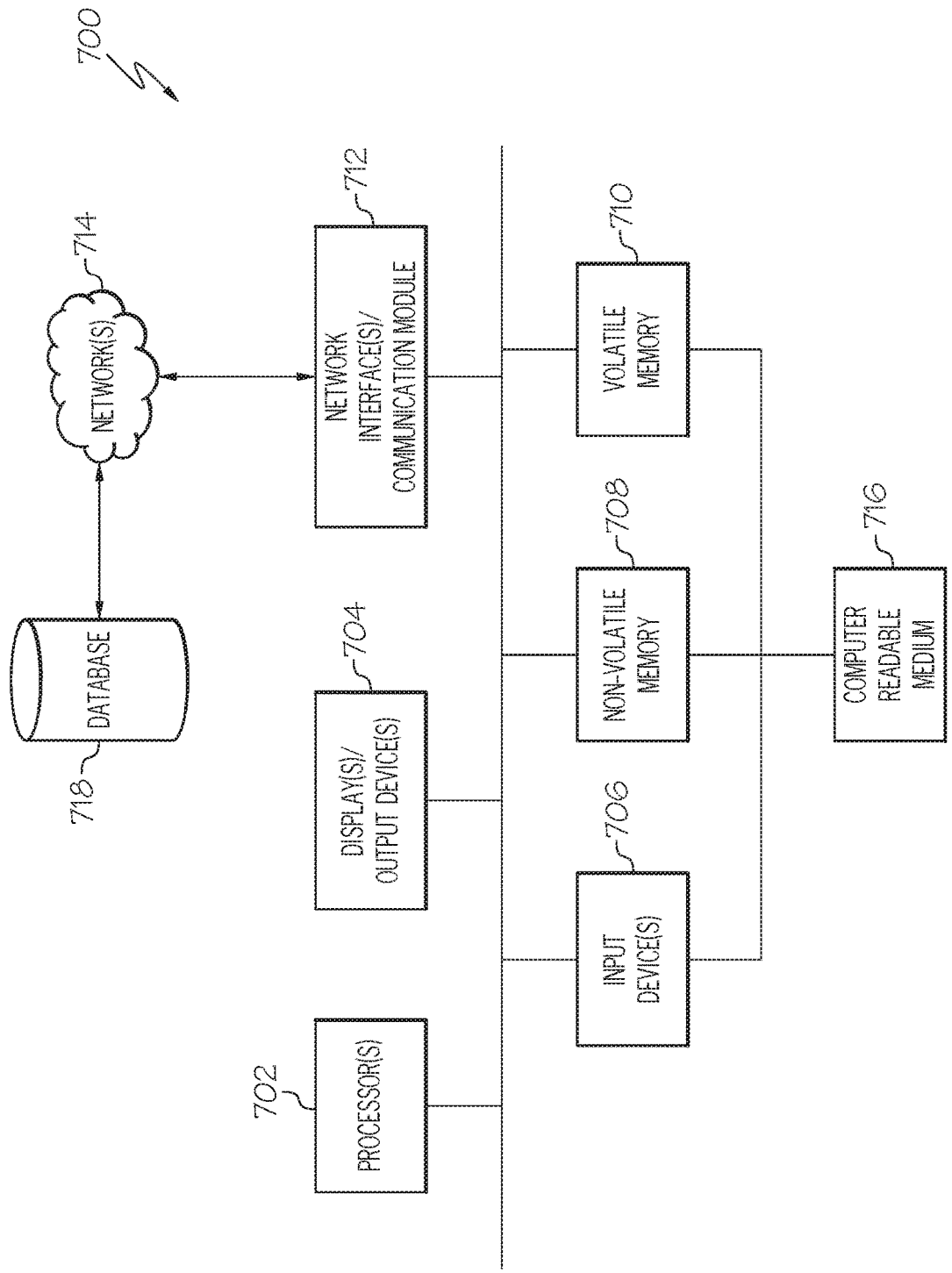
FIG. 7 is a block diagram illustrating computing hardware utilized in one or more devices for implementing various processes and systems, according one or more embodiments shown and described herein.
Figure 9:
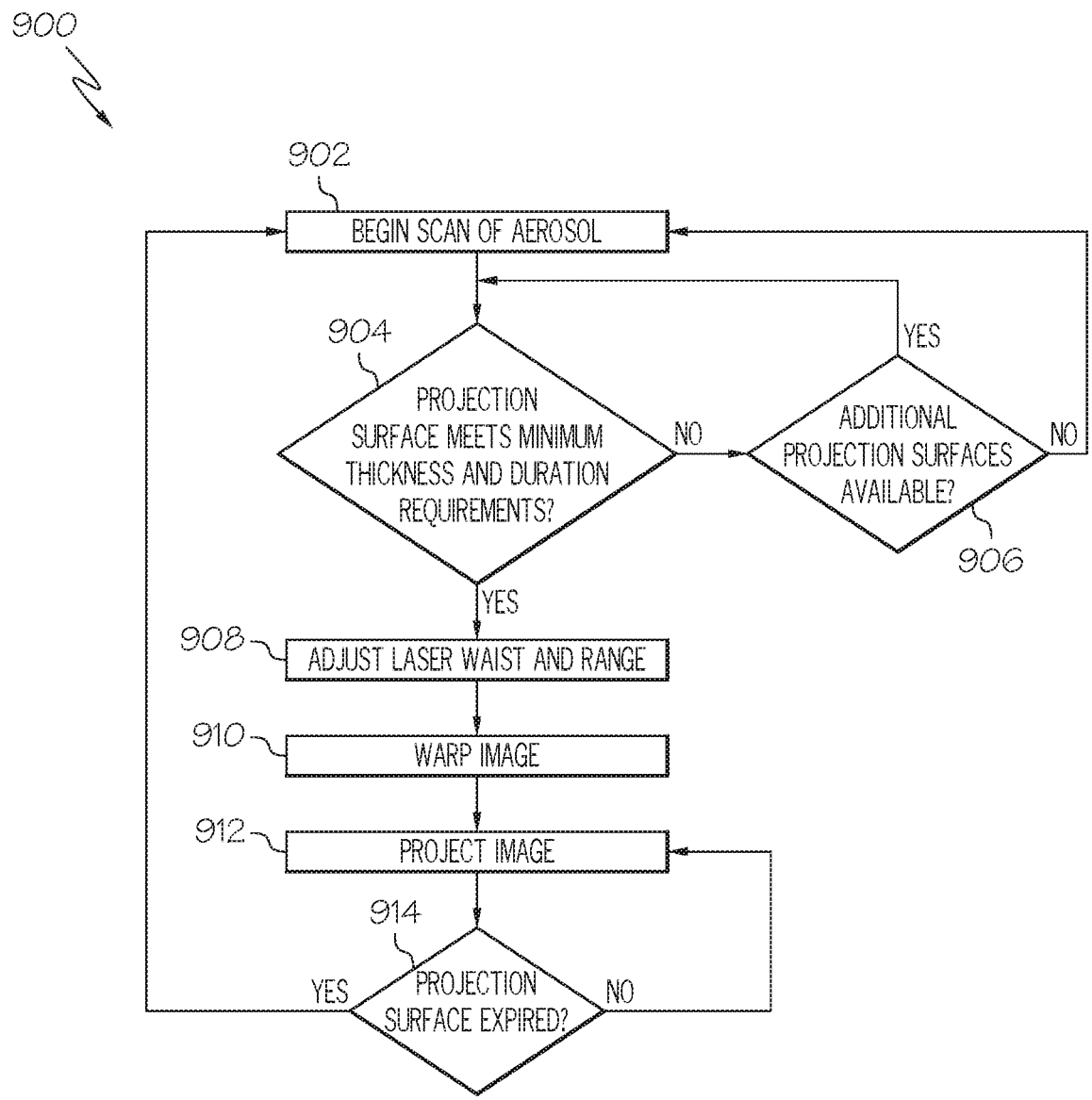
FIG. 9 is a flow chart depicting an exemplary process of modifying a projected image based upon changes in projection surfaces within an aerosol according to one or more embodiments described and illustrated herein.

Turning now to FIG. 7, a block diagram illustrates an exemplary computing device 700, through which embodiments of the disclosure can be implemented. The computing device 700 described herein is but one example of a suitable computing device and does not suggest any limitation on the scope of any embodiments presented. Nothing illustrated or described with respect to the computing device 700 should be interpreted as being required or as creating any type of dependency with respect to any element or plurality of elements. In various embodiments, a computing device 700 may include, but need not be limited to, a desktop, laptop, server, client, tablet, smartphone, on-board vehicle computer or any other type of device that can perform the functionalities described. In an embodiment, the computing device 700 includes at least one processor 702 and memory (non-volatile memory 708 and/or volatile memory 710). In some embodiments, the computing device 700 is a non-transitory computing device, in which the at least one processor is coupled to the memory (non-volatile memory 708 and/or volatile memory 710). A non-transitory computing device 700 may utilize, by way of non-limiting example, RAM, ROM, cache, fiber optics, EPROM/Flash memory, CD/DVD/BD-ROM, hard disk drives, solid-state storage, optical or magnetic storage devices, diskettes, electrical connections having a wire, any system or device that is of a magnetic, optical, semiconductor, or electronic type, or any combination thereof.

The computing device 700 can include one or more displays and/or output devices 704 such as monitors, speakers, headphones, projectors, wearable-displays, holographic displays, printers, the scanning device 104 described herein, and/or the laser projector 106 described herein. Output devices 704 may output audio sounds, visuals, aerosols, and the like. The computing device 700 may further include one or more input devices 706 which can include, by way of example, any type of mouse, keyboard, disk/media drive, memory stick/thumb-drive, memory card, pen, touch-input device, biometric scanner, voice/auditory input device, motion-detector, camera, scale, and/or the scanning device 104 described herein.

The computing device 700 may include non-volatile memory 708 (ROM, flash memory, etc.), volatile memory 710 (RAM, etc.), or a combination thereof. A network interface 712 can facilitate communications over a network 714 via wires, via a wide area network, via a local area network, via a personal area network, via a cellular network, via a satellite network, etc. Suitable local area networks may include wired Ethernet and/or wireless technologies such as, for example, wireless fidelity (Wi-Fi). Suitable personal area networks may include wireless technologies such as, for example, IrDA, Bluetooth, Wireless USB, Z-Wave, ZigBee, and/or other near field communication protocols. Suitable personal area networks may similarly include wired computer buses such as, for example, USB and FireWire. Suitable cellular networks include, but are not limited to, technologies such as LTE, WiMAX, UMTS, CDMA, and GSM. Network interface 712 can be communicatively coupled to any device capable of transmitting and/or receiving data via the network 714. Accordingly, the network interface hardware 712 can include a communication transceiver for sending and/or receiving any wired or wireless communication. For example, the network interface hardware 712 may include an antenna, a modem, LAN port, Wi-Fi card, WiMax card, mobile communications hardware, near-field communication hardware, satellite communication hardware and/or any wired or wireless hardware for communicating with other networks and/or devices.

A computer-readable medium 716 may comprise a plurality of computer readable mediums, each of which may be either a computer readable storage medium or a computer readable signal medium. A computer readable storage medium 716 may reside, for example, within an input device 706, non-volatile memory 708, volatile memory 710, or any combination thereof. A computer readable storage medium can include tangible media that is able to store instructions associated with, or used by, a device or system. A computer readable storage medium includes, by way of non-limiting examples: RAM, ROM, cache, fiber optics, EPROM/Flash memory, CD/DVD/BD-ROM, hard disk drives, solid-state storage, optical or magnetic storage devices, diskettes, electrical connections having a wire, or any combination thereof. A computer readable storage medium may also include, for example, a system or device that is of a magnetic, optical, semiconductor, or electronic type. Computer readable storage media and computer readable signal media are mutually exclusive.

A computer readable signal medium can include any type of computer readable medium that is not a computer readable storage medium and may include, for example, propagated signals taking any number of forms such as optical, electromagnetic, or a combination thereof. A computer readable signal medium may include propagated data signals containing computer readable code, for example, within a carrier wave. Computer readable storage media and computer readable signal media are mutually exclusive.

The computing device 700 may include one or more network interfaces 712 to facilitate communication with one or more remote databases 718 to remotely access data and store data, such as heat signatures and other types of object representations for retrieval by vehicle operators as described herein. A network interface 712 may also be described as a communications module, as these terms may be used interchangeably.

Turning now to FIG. 8, a flowchart 800 illustrates an exemplary process for projecting an image onto a changing projection surface within an aerosol. At block 802, an initial scan of an aerosol is performed by a vehicle to determine a projection surface, which may be based upon detecting aerosol portions via a density map. At block 804, an image is projected onto the projection surface and may also visible at a corresponding virtual image plane. At block 806, an updated scan is performed to update the projection surface based upon a changing depth and/or a changing distance of the projection surface relative to the vehicle. For example, if the vehicle and/or aerosol are in motion, or if the aerosol is changing, then the projection surface may change as well. At block 808, the projected image is modified based upon a change to the projection surface relative to the vehicle. Any number of updated scans may be performed. For example, scans may be performed continuously.

Turning now to FIG. 9, a flowchart 900 illustrates an exemplary process for modifying a projected image based upon changes in projection surfaces within an aerosol. At block 902, a scan of an aerosol begins. At block 904, a determination is made as to whether a projection surface located in the aerosol meets minimum thickness and/or duration requirements. For example, if the projection surface does not appear that it will last more than a minimum threshold period of time, it may not be of use to an observer, even if it meets a minimum thickness requirement. If not, then at 906 a determination is made as to whether additional projection planes are available. If other projection planes are available, then a scan of a new aerosol is undertaken to see if it has a projection surface that meets the minimum thickness and duration requirements by returning to block 904. If other aerosols are not available, then the aerosol is rescanned and the flowchart returns to block 902. If a determination is made that the projection surface located in the aerosol meets minimum thickness and/or duration requirements, then at block 908 the waist and range of a laser from a vehicle are adjusted according to the projection surface in the current aerosol. Any number of updated scans may be performed. For example, scans may be performed continuously.

At block 910, the image is modified based upon characteristics of the projection surface to counteract distortions, which may result in a warping of the image such that it will appear in the virtual image plane in its original form to a driver of the vehicle. At block 912, the image, having been warped, may be projected onto the projection surface. At block 914, a determination may be made as to whether the projection surface has expired. If not, then the flowchart returns to block 912, where the image continues to be projected. Otherwise, if the projection surface has expired, then the flowchart returns to block 902 to conduct another scan of an aerosol (whether the same aerosol or another one).

It should now be understood that embodiments described herein are directed to the detection of one or more projection surfaces within an aerosol relative to a vehicle. An image may be modified as a projector outputs the image onto a projection surface so that the image maintains its intended appearance. The vehicle's scanning device may repeatedly scan the aerosol to detect multiple projection surfaces and changes in the current projection surface. In this way, the image may appear consistent from a driver's point of view that can lead to improvements in how drivers operate vehicles when encountering aerosols.

It is noted that recitations herein of a component of the present disclosure being "configured" or "programmed" in a particular way, to embody a particular property, or to function in a particular manner, are structural recitations, as opposed to recitations of intended use. More specifically, the references herein to the manner in which a component is "configured" or "programmed" denotes an existing physical condition of the component and, as such, is to be taken as a definite recitation of the structural characteristics of the component.

The order of execution or performance of the operations in examples of the disclosure illustrated and described herein is not essential, unless otherwise specified. That is, the operations may be performed in any order, unless otherwise specified, and examples of the disclosure may include additional or fewer operations than those disclosed herein. For example, it is contemplated that executing or performing a particular operation before, contemporaneously with, or after another operation is within the scope of aspects of the disclosure.

It is noted that the terms "substantially" and "about" and "approximately" may be utilized herein to represent the inherent degree of uncertainty that may be attributed to any quantitative comparison, value, measurement, or other representation. These terms are also utilized herein to represent the degree by which a quantitative representation may vary from a stated reference without resulting in a change in the basic function of the subject matter at issue.

While particular embodiments have been illustrated and described herein, it should be understood that various other changes and modifications may be made without departing from the spirit and scope of the claimed subject matter. Moreover, although various aspects of the claimed subject matter have been described herein, such aspects need not be utilized in combination. It is therefore intended that the appended claims cover all such changes and modifications that are within the scope of the claimed subject matter.

The invention claimed is:

1. A system for projecting images from a vehicle onto a projection surface within an aerosol, comprising:
   a scanning device, to be mounted on the vehicle, configured to:
      perform an initial scan of the aerosol to determine the projection surface within the aerosol based upon an aerosol density map; and
      perform an updated scan to update the projection surface based on a changing depth and a changing distance of the projection surface relative to the scanning device over time; and
   a projector, to be mounted on the vehicle, configured to:
      project an image onto the projection surface within the aerosol; and
      modify the projected image based upon a change to the projection surface due to one or more of a motion of the vehicle and a change in the aerosol.

2. The system of claim 1 wherein the scanning device is further configured to:
   determine projection surface thickness; and
   compare the projection surface thickness to at least one of a minimum thickness threshold value and a maximum thickness threshold value.

3. The system of claim 1 wherein:
   the projector is configured to emit a laser beam; and
   the scanning device is a Flash LiDAR device comprising a plurality of infrared LEDs and at least one three dimensional focal plane array.

4. The system of claim 3 wherein the scanning device is further configured to use single photon counting to scan the aerosol to select one or more laser beam characteristics of the laser beam.

5. The system of claim 1 wherein the aerosol density map is based upon density and particle size of the aerosol as determined by the scanning device.

6. The system of claim 1 wherein the projection surface is further determined based upon a portion of the aerosol having at least a threshold density to reflect the images for at least a minimum duration threshold.

7. The system of claim 3 wherein a waist and a range of the laser beam are based on a depth and a distance between the projection surface and the scanning device.

8. The system of claim 7 wherein the waist and the range the laser beam are updated based on a changing depth and a changing distance between the projection surface and the scanning device.

9. The system of claim 1 wherein:
   the scanning device is further configured to determine that the projection surface is neither flat nor linear; and
   the projector is further configured to project the image as warped to accommodate the non-flat and non-linear projection surface from a viewpoint within the vehicle.

10. The system of claim 9 wherein:
    the projection surface is determined utilizing ray tracing with respect to a first perspective though a virtual image plane points and onto interpolated projection surface points; and
    the first perspective is in a different location than the scanning device position.

11. The system of claim 1 wherein:
    a plurality of projection surfaces are detected by the scanning device; and
    a three dimensional image is projected onto the plurality of projection surfaces.

12. The system of claim 1 wherein the projector is further configured to modify a size of an object within the projected image based on changing proximity of the object to the scanning device.

13. The system of claim 1 wherein the scanning device is further configured to update the projection surface based upon a scanning refresh rate governed by a specified scanning refresh rate parameter.

14. The system of claim 1 wherein:
the scanning device is further configured to receive data from an external object pertaining to the external object; and
the projector is further configured to project the image pertaining to the external object based upon the data received from the external object.

15. A method for projecting images from a vehicle onto a projection surface within an aerosol, the method comprising:
performing an initial scan of the aerosol to determine the projection surface within the aerosol based upon an aerosol density map;
projecting an image onto the projection surface within the aerosol;
performing an updated scan to update the projection surface based on changing depth and changing distance of the projection surface relative to the scanning device over time; and
modifying the image being projected based upon a change to the projection surface due to one or more of a motion of the vehicle and a change in the aerosol.

16. The method of claim 15 further comprising:
determining projection surface thickness; and
comparing the projection surface thickness to at least one of a minimum thickness threshold value and a maximum thickness threshold value.

17. The method of claim 15 wherein the aerosol density map is based upon density and particle size of the aerosol.

18. The method of claim 15 further comprising:
determining that the projection surface is neither flat nor linear; and
projecting the image as warped to accommodate the non-flat and non-linear projection surface from a viewpoint within the vehicle.

19. A system for projecting images from a vehicle onto a projection surface within an aerosol, comprising:
a Flash LiDAR device comprising a plurality of infrared LEDs and at least one three dimensional focal plane array, wherein the Flash LiDAR device is to be mounted on a vehicle and is configured to:
use single photon counting to scan the aerosol to determine laser beam characteristics;
perform an initial scan of the aerosol to determine:
the projection surface within the aerosol based upon an aerosol density map based upon density and particle size of the aerosol as determined by the Flash LiDAR device; and
that the projection surface is neither flat nor linear; and
perform an updated scan to update the projection surface based on changing depth and changing distance of the projection surface relative to the scanning device aboard the vehicle over time; and
a laser projector, to be mounted on the vehicle, configured to:
project onto the projection surface, using a laser beam according to the laser beam characteristics, a warped image such that the projected image is warped to appear flat from a viewpoint within the vehicle, and wherein the laser beam characteristics include a waist and a range of the laser beam based on a depth and a distance of the projection surface from the scanning device; and
modify the image being projected based upon a change to the projection surface due to one or more of a motion of the vehicle and a change in the aerosol.

20. The system of claim 19 wherein the scanning device is further configured to update the projection surface based upon a scanning refresh rate governed by a specified scanning refresh rate parameter.

* * * * *